United States Patent [19]

Maekawa

[11] 4,154,511
[45] May 15, 1979

[54] COMPACT OPTICAL LENS BARREL MECHANISM

[75] Inventor: Yukio Maekawa, Osaka, Japan

[73] Assignee: Minolta Camera Kabushiki Kaisha, Osaka, Japan

[21] Appl. No.: 829,199

[22] Filed: Aug. 30, 1977

[30] Foreign Application Priority Data

Sep. 10, 1976 [JP] Japan ................... 51/107942

[51] Int. Cl.² .................................. G02B 5/00
[52] U.S. Cl. ........................... 350/255; 250/188
[58] Field of Search ............... 350/188, 175 FS, 255, 350/276, 187, 44, 40, 186, 194; 355/125; 95/65; 240/41.4

[56] References Cited

U.S. PATENT DOCUMENTS

| | | | |
|---|---|---|---|
| 1,463,132 | 7/1923 | Graf | 350/188 |
| 3,455,628 | 7/1969 | Back | 350/44 |
| 3,827,779 | 8/1974 | Hapke et al. | 350/44 |
| 3,850,507 | 11/1974 | Vesugi | 350/187 |
| 3,904,275 | 9/1975 | Noguchi et al. | 350/175 FS |
| 4,124,276 | 11/1978 | OKano et al. | 350/188 |

Primary Examiner—John K. Corbin
Assistant Examiner—B. W. de los Reyes
Attorney, Agent, or Firm—Harold L. Jackson; Stanley R. Jones; Joseph W. Price

[57] ABSTRACT

A compact optical lens barrel mechanism for relative-nonrotational displacement of a series of lens elements forming an optical system is provided. Lens elements can be mounted for selective subdivision into operative lens groups for both focusing and introducing a variable soft focus condition. The barrel mechanism includes a mounting cylinder having appropriate linear alignment elements. A translational cylinder is rotatively journalled within the mounting cylinder. Three lens mounting members can be relatively movable and are designed to each carry a predetermined number of lens elements. The rear lens mounting member can be moved by the translational cylinder to provide a variable amount of spherical aberration to produce a soft focus condition. An exterior focusing ring and a soft focus condition ring can be rotatively mounted relative to the stationary mounting cylinder for linearly moving the respective mounting members.

16 Claims, 4 Drawing Figures

COMPACT OPTICAL LENS BARREL MECHANISM

BACKGROUND OF THE INVENTION

1. Field of the Invention

The present invention relates to a compact lens barrel mechanism suitable for an optical lens system having relatively shiftable lens groups and more particularly to a lens barrel mechanism for relatively shifting the lens group in a linear movement along the optical axis to accomplish two or more modes of operation.

2. Description of the Prior Art

The prior art is quite familiar with various forms of lens barrel mechanism for mechanically shifting relative groups of lens. Quite frequently, the lens barrel mechanisms will rotate the lens groups in a spiral or helicoidal movement along the optical axis. As can be appreciated, lenses moved in this fashion must be carefully centered and aligned to maintain a correct position on the optical axis regardless of the relative movement. For example, U.S. Pat. No. 3,904,275 is of interest in showing a lens barrel mechanism for moving a front and rear lens group.

Additionally, it is known that a soft focus condition can improve certain pictures.

The prior art is still striving to optimize the design of lenses with the most compact lens barrel mechanism that is economically and physically capable of being utilized. The consumer market is demanding light and more compact lenses at commercially acceptable prices. Accordingly, there is still a need in the prior art to optimize a lens barrel mechanism within these parameters.

SUMMARY OF THE INVENTION

An object of the present invention is to provide a compact lens barrel mechanism for a novel lens system having at least three separate lens groups. The first lens group need only be shifted relative to the second and third lens groups for varying the air space between the first and second lens group in a first mode of operation. The third lens group is required to be shifted at a different ratio from that of the first and second lens group in a second mode of operation.

Another object of the present invention is to provide a compact lens barrel mechanism which can provide the above mentioned shifting of the lens groups without any rotation of the lens groups about the optical axis. That is, it is desirable for the lens groups to linearly move along the optical axis without using the heretofore conventional rotation of the individual lens elements. Another advantage of the present invention is to simplify the diaphragm control and to prevent any disturbance of the mechanical connection of the diaphragm mechanism with the control mechanism located within the camera body.

Still another advantage of the present invention is to prevent any eccentric dislocation between the lens groups resulting from any relative rotation of the lens group during their movement along the optical axis. Finally, an additional advantage of the present invention is to permit the attachment of polarization filters and/or rectangular hoods to the first lens group and not to rotate them about the optical axis during the different modes of operation of the lens system.

The above advantages can be realized by providing a compact optical lens barrel mechanism to accommodate relatively shiftable lens groups including a fixed cylinder; a transitional cylinder journalled in the fixed cylinder for relative circulate movement, and a plurality of individual lens element mounting members having appropriate linear alignment elements for coacting with other appropriately positioned linear alignment elements within the lens barrel mechanism. Rotational means are provided to permit the selective movement of predetermined mounting members to provide both a focusing and soft focus mode of operation.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

The following description is provided to enable any person skilled in the optical art to make and use the invention and sets forth the best mode contemplated by the inventor in carrying out his invention. Various modifications, however, will remain readily apparent to those skilled in the art, since the generic principles of the present invention have been defined herein specifically to provide a compact lens barrel mechanism that can be manufactured in a relatively economical manner. The illustrated embodiment of the present invention is specifically advantageous for use with a variable soft focus lens system such as that described in U.S. Pat. No. 4,124,276 issued Nov. 7, 1978 for AN IMPROVED SOFT FOCUS LENS SYSTEM and assigned to the same assignee of the present invention. The disclosure of that application, although not essential for an understanding of the present invention, is hereby incorporated by reference to facilitate a greater understanding of the advantages of the present invention.

Figure 1:
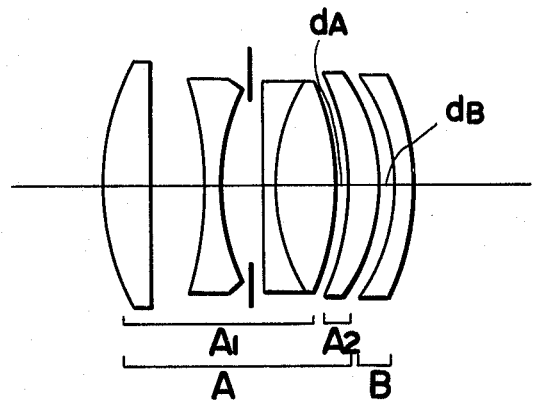
FIG. 1 is a schematic view of one example of a variable soft focus lens system that can be mounted in the lens barrel mechanism of the present invention.

Referring to the schematic view of FIG. 1, a variable soft focus lens system of the type disclosed in the U.S. Pat. No. 4,124,276 is disclosed. As can be seen from FIG. 1, the lens system is divided into lens groups A and B with a variable air space dB separating them. Any variance of that air space dB, for example by widening or narrowing the air space will effect the amount of spherical aberration that is introduced into the final image, thus, the transmitted image can have only that amount of spherical aberration that is within the tolerances of a normal photographic condition to provide a sharp image or it can have any subjective amount of spherical aberration to provide a soft focus condition that is sometimes highly desirable in portrait and other photographs.

The lens group A is further divided into a pair of sub lens groups A1 and A2 having a variable air space dA separating them. This air space dA can be varied during a focusing mode of operation as will be described subsequently. To optimize the optical design, it is generally preferable that the subgroup A1 will include the diaphragm.

During a first mode of operation such as focusing, the subgroup A2 and the lens group B are maintained stationary while the subgroup A1 is shifted along the optical axis to thereby vary the width of the air space dA.

In the second mode of operation, a variable amount of spherical aberration can be introduced into the transmitted image by having the lens group A (with the air space dA maintained constant) and the lens group B moved at different ratios along the optical axis to thereby vary the air space dB. Both the lens groups A and B are moved in this mode of operation also to vary the air space dB to provide a compensation for any deviation of the image plane from the focal plane which would otherwise result from simply varying the air space dB.

Accordingly, by this movement of the lens groups A and B, the focus condition achieved by the setting of the air space dA is accurately maintained during the shifting from a normal sharp photographic condition to various soft focus conditions. As can be readily appreciated, soft focus photography is easily achieved in the above described lens system of FIG. 1. Since the lens system can be set into a normal sharp photography condition, the focusing operation can be achieved as easily as in the case of a normal lens system. After the focusing operation is completed, it is easy to shift from the normal photography condition to a desired soft focus condition without losing the focus condition desired. The lens system, accordingly, eliminates the problems generally associated with focusing for soft focus photography.

Figure 2:
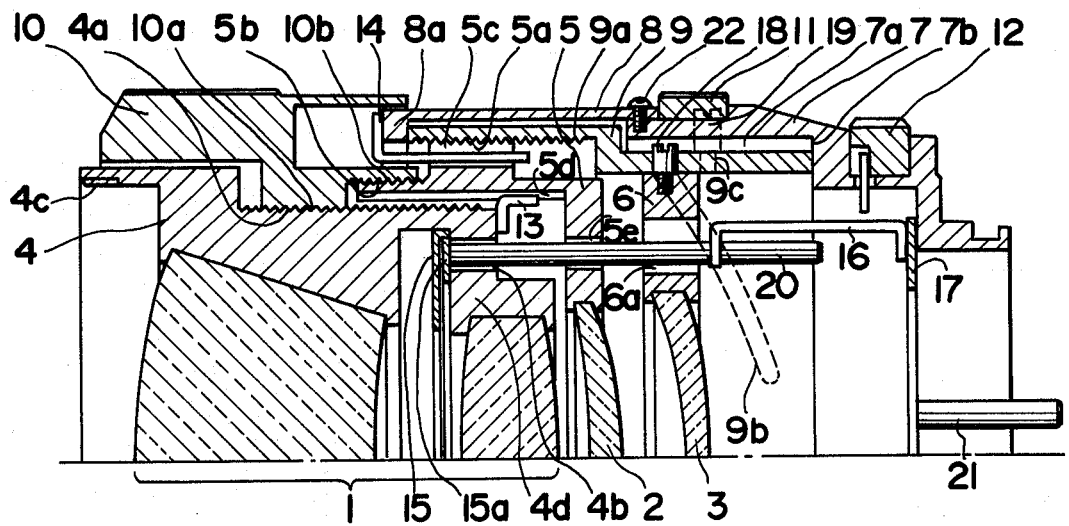
FIGS. 2, 3 and 4 are respective half cross-sectional views of an embodiment of the present invention shown in various operational modes.

Referring to FIG. 2, an embodiment of the present invention is disclosed in a cross-sectional view to advantageously disclose the relative movement of the lens group required in the soft focus condition lens system. In FIG. 2, a first lens group 1 includes a diaphragm while the second lens group 2 and third lens group 3 are simply shown symbolically and actually correspond to the subgroup A1, subgroup A2 and lens group B shown in FIG. 1. A first lens mounting member or lens barrel 4, mounts a predetermined number of lens elements and provides a helical formation or external thread 4a over a portion of its exterior peripheral surface. The lens barrel 4 includes a thick wall portion on its inner periphery to support a diaphragm support ring 15 and a diaphragm operator ring 15a which is rotatively mounted on the diaphragm support ring 15 in a marginal position. An annular lens holding portion 4d projecting rearward along the direction of the optical axis from the inner peripheral wall of the first lens barrel 4 includes an annular elongated opening 4b. The purpose of this opening 4b, is to permit a follower pin 20 to have access to the diaphragm operator ring 15a. Thus, the follower pin 20 can extend through an elongated opening 4b and can rotate the diaphragm operator ring 15a without interference. Although not shown in the drawing for purposes of simplicity, the diaphragm, as is conventionally known, is interposed between the diaphragm support ring 15 and the diaphragm operator ring 15a. The diaphragm is pivotally supported by one of the rings and associated with the other ring through a conventional pin-cam slot arrangement so that the diaphragm setting will be governed by the rotation of the follower pin. The lens retaining portion 4d of the first lens barrel 4, is actually manufactured independently of the barrel body 4 and joined during assembly. However, for ease of illustration in the drawing it is simply shown as a one piece member with the barrel body 4.

A second lens mounting member or lens barrel 5 is loosely fitted over a rear portion of the first lens group 4 and carries a second lens group 2 which is rigidly mounted on its interface. The second lens barrel 5 includes an annularly elongated opening 5e to permit the passage of the diaphragm follower pin 20. The inner peripheral face of the second lens barrel 5 is formed with a longitudinally extending linear slot 5d, that is parallel with the optical axis. A follower key 13 is connected to and radially extends from the end face of the first lens barrel 4 to engage the linear slot 5d. This arrangement prevents the first lens barrel 4 and the second lens barrel 5, from any relative rotation while still permitting a linear displacement. The outer peripheral side face of the second lens barrel 5 includes an annular ring having both an external thread 5a and a longitudinally extending linear slot 5c extending parallel with the optical axis. A smaller diameter portion of the second lens barrel also carries an external thread 5b for interfacing with a focusing ring to be described subsequently. A third lens mounting member or third lens barrel 6 mounts a predetermined number of lens elements forming a third lens group 3. The third lens barrel 6 also includes an annularly elongated opening 6a to again permit the continued passage of the diaphragm follower pin 20 parallel to the optical axis. A single guide follower pin 18 is mounted on the outer periphery of the third lens barrel 6 to provide a sliding linear movement to the third lens barrel 6.

A stationary mounting cylinder 7 which forms part of the exterior housing is connected or connectable with a camera body (not shown). The mounting cylinder 7 includes a first and second linear alignment element. One of the linear alignment elements is a guide slot 7a extending along its inner peripheral wall. A soft focus control ring 11 and the diaphragm ring 12 are mounted on the exterior of the stationary cylinder 7 and are rotatable thereabout in appropriate grooves. An index ring 8 is secured to and forms part of the forward end of the stationary cylinder 7. It is connected to the stationary cylinder 7 by means of a rivet 22 and has a forward end of a thick wall formation 8a. A cantilevered key 14, which forms the second linear alignment element, is rigidly secured to the forward end formation 8a and extends parallel to the optical axis. The cantilevered key 14 engages the longitudinal linear slot 5c on the second lens barrel 5. This arrangement prevents relative rotation of the second lens barrel 5 with respect to the stationary cylinder 7 about the optical axis.

A translational or outer cylinder 9 is journalled within the stationary mounting cylinder 7 to provide only relative circulate movement. The cylinder 9 is positioned between the thick wall portion 8a and a shoulder or land portion 7b formed on the rear interface of the stationary cylinder 7. The cam like head opening 9b is cut into the inner peripheral wall and forms a helical slot. The follower guide pin 18 is mounted on the third lens barrel 6 and extends into and through the cam like opening 9b to engage the linear alignment slot 7a on the stationary cylinder 7. A forward inner face of the outer cylinder 9 has an internally threaded portion 9a that engages the externally threaded portion 5a of the second lens barrel 5 to form a helicoid.

Extending forward of and loosely fitted over the index ring 8 of the stationary cylinder 7 is a distance or focus adjusting ring 10. The inner face of this ring 10 has internal threads 10a and 10b. The internal thread 10a meshes with the external thread 4a of the first lens barrel 4 to form a first helicoid, while the internal thread 10b thereof is in mesh with the external thread 5b of the second lens barrel to form a second helicoid. The third helicoid is formed between the threaded portion 5a of the second lens barrel 5 and the internal threaded portion 9a of the outer cylinder 9.

A pin 19 having a head fitted into a round hole or axially extending elongated slot formed in the inner periphery of the soft focus control ring 11 extends through an annular slot formed in the stationary cylinder 7 and threadingly fits into the threaded slot 9c formed in the outer cylinder 9. Accordingly, the control ring 11 and the outer cylinder 9 will rotate as one unit. A lever 16 extends parallel to the optical axis and engages the diaphragm associated pin to form a diaphragm control lever. The lever 16 is in turn connected to a ring 17 which is also connected to a pin 21 extending beyond the rear surface of the stationary cylinder 7. The pin 21 is designed to extend into the inside of the camera body thus forming an automatic diaphragm linkage that is adapted to rotate the diaphragm support ring 15 to any desired predetermined opening. As can be appreciated, the mounting of the lens mounting members for linear movement plus the provision of appropriate openings permits the operation of the diaphragm without any interference.

The following description is directed to the modes of operation of the mechanism of the present invention. To facilitate a better understanding of the invention, it is convenient to start with a mode of operation in which the distance adjusting ring 10 is rotated for the purposes of focusing relative to the initial condition disclosed in the illustration of FIG. 2. Accordingly, reference is made to both FIG. 2 and FIG. 3.

Since the second lens barrel 5 is prevented from rotation about the optical axis by the engagement of the linear slot 5c and the key 14, the distance adjusting ring 10 is displaced in the direction of the optical axis as it is rotated. This displacement is governed by the pitch of the second helicoid formed between threads 5b and 10b. The first lens barrel 4, however, is also precluded from rotation about the optical axis by the linear slot 5b in the key 13. Therefore, as a result of the coaction of the helicoid formed by the threads 4a and 10a, the first lens barrel 4 will be shifted forward and in the direction of the optical axis as a result of the rotation of the distance adjusting ring 10. Thus, with reference to the stationary cylinder 7, the first lens barrel 4 is shifted without being accompanied by any rotation. The movement or shift is according to the composite pitch of the first and second helicoids and will result in a displacement of the lens elements from the condition illustrated in FIG. 2 to the condition shown in FIG. 3. This shifting movement will adjust the air space between the first lens group 1 and the second lens group 2, thereby permitting optimum focusing from infinity to a relatively close distance. Since the rotation of the distance adjusting ring 10 has no influence whatsoever upon the second lens barrel 5 and the third lens barrel 6, these lens barrels will remain stationary.

Figure 4:
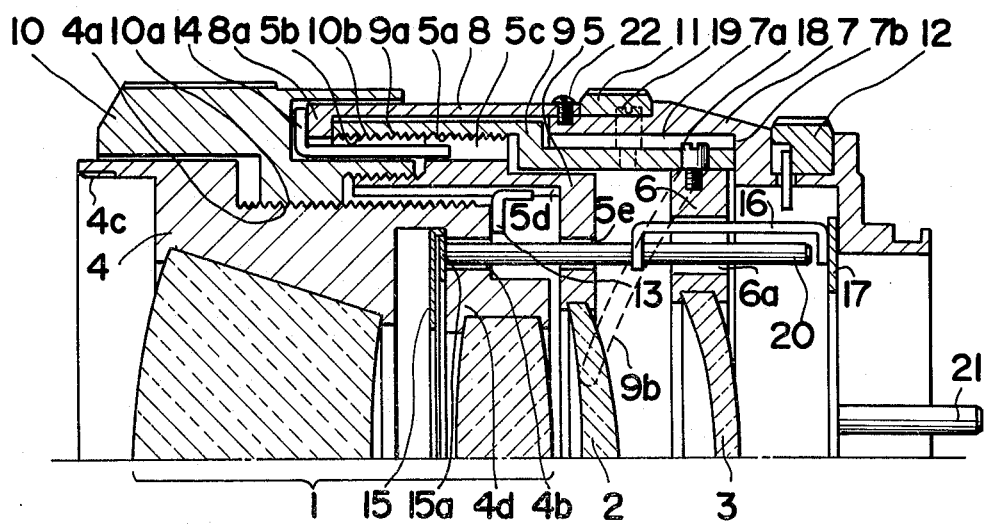

Assuming that the proper focus has been reached and the photographer desires to introduce a soft focus condition, he will then rotate the soft focus control ring 11. For purposes of description, it will be assumed that FIG. 2 has provided the optimized focusing condition for normal photography. Reference is then made to FIG. 4 for comparison purposes. As the soft focus control ring 11 is rotated, it also rotates the translational or outer cylinder 9. The outer cylinder 9 translates this rotational force into a linear movement through the coaction of the cam like lead opening 9b formed in the outer cylinder 9 and the follower guide pin 18. This linear movement is achieved since the follower guide pin 18 is also journalled into the linear slot 7a formed in the stationary cylinder 7. Thus, the guide pin 18 will retract rearwardly and in parallel with the optical axis whereby the third lens barrel 6 will also be shifted rearwardly in the direction of the optical axis without any rotation. The second lens barrel 5 is precluded from any rotation as a result of the interface of the linear slot 5c in the key 14. Therefore, as a result of the action of the third helicoid 5a, 9a, the second lens barrel 5 will be shifted rearwardly along the optical axis. Since no relative movement takes place between the first helicoid elements 4a and 10a or between the second helicoid elements 5b and 10b, the distance adjusting ring and the first lens barrel 4 are shifted as a unit with the second barrel 5 rearwardly in the direction of the optical axis. As a result, the air space between the first lens group 1 and the second lens group 2 is held constant.

In the specific embodiments disclosed, the pitch of the lead opening 9b in the outer cylinder 9 is greater than the pitch of the third helicoid 5a, 9a and accordingly, the ratio of the rearward shift of the third lens barrel 6 is greater than that of the second lens barrel 5. The result is that the air space between the second lens group 2 and the third lens group 3 will be widened. It should be realized the pitch of the third helicoid 5a, 9a and the pitch or configuration of the lead opening 9b are also determined so that any compensation may be made for the deviation of the image plane from the focal plane due to a variation in the air space between the second lens group and the third lens group.

Figure 3:
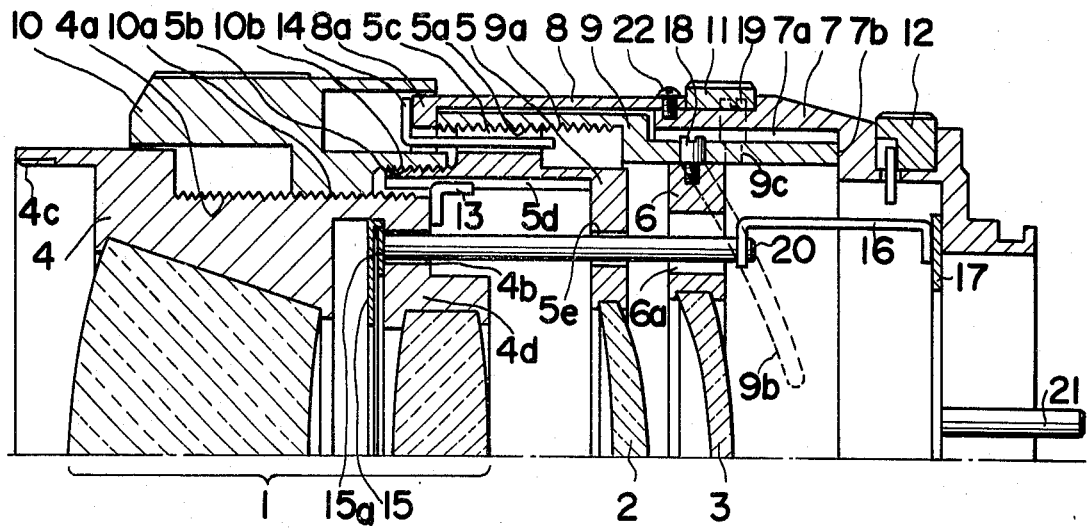

Thus, when the soft focus control ring 11 is rotated from the condition of FIG. 3, the third lens group 3 is shifted rearwardly by the action of the linear slot 7a and the cam like lead opening 9b. While the second lens group 2 is also shifted rearwardly by the action of the third helicoid 5a and 9a. Since there is no relative movement associated with the first helicoid 4a, 10a or the second helicoid 5b, 10b, the first lens group 1 is shifted as a unit with the second lens group 2 rearwardly with the air space between the first lens group 1 and second lens group 2, as shown in FIG. 3 being kept unchanged.

Accordingly, the first mode of operation for focusing and the second mode of operation for a soft focus control can be accomplished as described above. In both of the modes of operation the shifting of the respective lens groups are along the optical axis without any accompanying rotation. Therefore, any attachment mounts such as indicated at 4c may be suitably provided on the first lens barrel 4. Since the attachment mount 4c, thus provided, will not turn even when the first lens group 1 is shifted in the direction of the optical axis, it can accept any attachment wherein rotation would be objectionable such as a polarization filter or a rectangular hood. Moreover, since each lens group is shifted in the direction of the optical axis without any rotation, any eccentric dislocation between these lens groups can be avoided.

It also should be appreciated that since the lens groups do not rotate that this simplifies the diaphragm control. Thus, as explained in connection with FIG. 2, the diameter of the diaphragm aperture is controlled by the follower pin 20, and the openings in the mounting lens barrels permit this follower pin to be activated without any interference.

As can be readily appreciated, it is possible to deviate from the above embodiment of the present invention and as will be readily understood by those skilled in the art, the invention is capable of many modifications and improvements within the scope and spirit thereof. Accordingly, it will be understood that the invention is not to be limited by the specific disclosed embodiment but only by the scope and spirit of the appended claims.

What is claimed is:

1. A lens barrel mechanism for a lens system formed from relatively shiftable lens groups and capable of providing a focusing function and a second optical function by varying the relative nonrotational movement of the lens groups, comprising:

a fixed cylinder;

first lens group mounting means shiftable along the optical axis of the lens system relatively to the fixed cylinder;

first means for preventing the first lens group mounting means from rotating around the optical axis relatively to the fixed cylinder;

second lens group mounting means shiftable along the optical axis relatively to the fixed cylinder;

second means for preventing the second lens group mounting means from rotating around the optical axis relatively to the fixed cylinder;

third lens group mounting means shiftable along the optical axis relatively to the fixed cylinder;

third means for preventing the third lens group mounting means from rotating around the optical axis relatively to the fixed cylinder;

first rotatable means, manually operable to rotate around the optical axis relatively to the fixed cylinder, for connecting the second and third lens group mounting means with the fixed cylinder and for shifting the second and third lens group mounting means relatively to the fixed cylinder at different ratios upon the rotation of the first rotatable means; and second rotatable means manually operable to rotate around the optical axis relatively to the second lens group mounting means and to the first lens group mounting means, for connecting the first lens group mounting means with the second lens group mounting means to thereby shift the first lens group mounting means relative to the second lens group mounting means upon the rotation of the second rotatable means, wherein rotation of one of the first and second rotatable means provides a focusing function for the lens system while rotation of the other provides a second optical function effecting a transmitted image.

2. A lens barrel mechanism as in claim 1 wherein the first rotatable means includes first means for generating a force to shift the second lens group mounting means relatively to the fixed cylinder by means of a displacement about the optical axis between the first rotatable means and the second lens group mounting means and second means for generating a force to shift the third lens group mounting means relatively to the fixed cylinder by means of a displacement about the optical axis between the first rotatable means and the third lens group mounting means, and the second rotatable means further includes third means for generating a force to shift the first lens group mounting means relatively to the second lens group mounting means by means of a displacement about the optical axis between the second rotatable means and at least one of the first and second lens group mounting means.

3. A lens barrel mechanism as in claim 2, wherein the first generating means includes a helicoidal mechanism located between the first rotatable means and the second lens group mounting means.

4. A lens barrel mechanism as in claim 2, wherein the second generating means includes a cam-and-follower mechanism located between the first rotatable means and the third lens group mounting means.

5. A lens barrel mechanism as in claim 2, wherein the third generating means includes at least a helicoidal mechanism located between the second rotatable means and one of the first and second lens group mounting means.

6. A lens barrel mechanism as in claim 2, wherein the third generating means includes a pair of helicoidal mechanisms located between the second rotatable means and the first lens group mounting means and between the second rotatable means and the second lens group mounting means, respectively.

7. A lens barrel mechanism as in claim 1, wherein the first rotatable means includes a manually operable soft focus control ring and wherein the second rotatable means includes a manually operable focusing ring, the second optical function providing a soft focus condition to the transmitted image.

8. A lens barrel mechanism as in claim 1, further comprising a diaphragm mechanism mounted on the first lens group mounting means.

9. A lens barrel mechanism as in claim 8, wherein the diaphragm mechanism includes an interlinking member penetrating through the second and third lens group mounting means and extending toward the rear of the lens system.

10. A lens barrel mechanism as in claim 1, wherein the first lens group mounting means further has a connecting means for attachments at the front of the first lens group mounting means.

11. A lens barrel mechanism as in claim 1, wherein the first preventing means includes means for preventing a displacement about the optical axis between the first and second lens group mounting means, the first lens group mounting means being prevented from rotating relative to the fixed cylinder because the second lens group mounting means is prevented from rotating relatively to the fixed cylinder by the second preventing means.

12. A compact optical lens barrel mechanism for relative nonrotational displacement of a series of lens elements, forming an optical system, the lens elements forming a first and second lens group for a focusing mode of operation and a separate third and fourth lens group for providing a variable soft focus condition, comprising;

a stationary mounting cylinder having first and second linear alignment elements;

a translational cylinder connected to the mounting cylinder for relative circulate movement;

a first lens mounting member for mounting a predetermined number of lens elements having at least one first lens linear alignment element;

a second lens mounting member for mounting a predetermined number of lens elements having a pair of second lens linear alignment elements for operative contact with the first alignment element of the stationary mounting cylinder and the first lens alignment element;

a third lens mounting member for mounting a predetermined number of lens elements having at least one third lens linear alignment element for operative contact with the second alignment element of the stationary mounting cylinder, the respective lens mounting members being operatively connected to the stationary mounting cylinder;

means for focusing the optical system by selectively moving predetermined mounting members, and means for introducing a soft focus condition by selectively moving predetermined mounting members including at least one mounting member being moved by the rotation of the translational cylinder.

13. The invention of claim 12 wherein the first linear alignment element is a cantilevered key and the second linear alignment element is a longitudinal slot.

14. The invention of claim 13 wherein the translational cylinder includes a helical cam opening and the third lens linear alignment element includes a follower guide pin extending through the cam opening and journalled in the stationary mounting cylinder longitudinal alignment slot, whereby rotation of the translational cylinder causes linear relative movement of the third lens mounting member to introduce a controlled amount of spherical aberration for producing a soft focus condition.

15. The invention of claim 12 further including a diaphragm and a diaphragm control lever wherein each mounting member includes an opening for receiving the control lever extending parallel to the optical axis.

16. A compact optical lens barrel mechanism for relative nonrotational displacement of a series of lens elements, forming an optical system, the lens elements forming a first and second lens group for a focusing mode of operation and a separate third and fourth lens group for providing a second optical mode of operation effecting the transmitted image comprising:

a stationary mounting cylinder having first and second linear alignment elements;

a translational cylinder connected to the mounting cylinder for relative circulate movement;

a first lens mounting member for mounting a predetermined number of lens elements having a pair of second lens linear alignment elements for operative contact with the first alignment element of the stationary mounting cylinder and the first lens alignment element;

a third lens mounting member for mounting a predetermined number of lens elements having at least one third lens linear alignment element for operative contact with the second alignment element of the stationary mounting cylinder, the respective lens mounting members being operatively connected to the stationary mounting cylinder;

means for focusing the optical system by selectively moving predetermined mounting members, and means for introducing a second optical mode of operation by selectively moving predetermined mounting members including at least one mounting member being moved by the rotation of the translational cylinder.

* * * * *